United States Patent [19]

Gosger

[11] Patent Number: 4,559,435
[45] Date of Patent: Dec. 17, 1985

[54] SPARK-EROSIVE PLANETARY ERODING APPARATUS WITH VARIABLE FLOW RATE OF DIELECTRIC FLUID

[75] Inventor: Peter Gosger, Solingen, Fed. Rep. of Germany

[73] Assignee: AEG Elotherm, GmbH, Remscheid, Fed. Rep. of Germany

[21] Appl. No.: 676,596

[22] Filed: Nov. 30, 1984

Related U.S. Application Data

[63] Continuation of Ser. No. 462,075, Jan. 28, 1983, abandoned.

[30] Foreign Application Priority Data

Jan. 28, 1982 [DE] Fed. Rep. of Germany ....... 3202640

[51] Int. Cl.⁴ .............................................. B23P 1/08
[52] U.S. Cl. ................. 219/69 D; 219/69 G
[58] Field of Search ............... 219/69 D, 69 G, 69 R, 219/68, 69 M, 69 V; 204/129.6, 129.7

[56] References Cited

U.S. PATENT DOCUMENTS 4,289,947 9/1981 Inove ................................ 219/69 D

FOREIGN PATENT DOCUMENTS 0065035 5/1980 Japan ................................. 219/69 D
0137846 10/1980 Japan ................................. 219/69 D
0561648 7/1977 U.S.S.R. .......................... 219/69 D Primary Examiner—M. H. Paschall
Attorney, Agent, or Firm—Cushman, Darby & Cushman

[57] ABSTRACT

An apparatus for spark-erosive planetary eroding of a workpiece in which an eroding electrode is lowered into the workpiece as the workpiece is eroded and the workpiece and electrode carry out planetary motion with respect to each other so the operation gap between the narrow periphery of the electrode and the workpiece moves around the periphery of the electrode during planetary motion. A plurality of injection nozzles are positioned around the gap for supplying liquid dielectric thereto in accordance with the planetary movement. A plate having bores therethrough closes a chamber containing such liquid with each bore supplying a nozzle. The bores terminate at a wall of the chamber so that the opening into the chamber and therefore the supply to each nozzle is varied in accordance with the planetary movement.

1 Claim, 3 Drawing Figures

SPARK-EROSIVE PLANETARY ERODING APPARATUS WITH VARIABLE FLOW RATE OF DIELECTRIC FLUID

This is a continuation of application Ser. No. 462,075, filed Jan. 28, 1983, now abandoned.

The invention relates to an apparatus for the spark-erosive planetary eroding of a workpiece with an eroding electrode which may be lowered into the workpiece as the workpiece and the eroding electrode are subject to relative circular movement. Several injection nozzles are distributed around the operating gap between the eroding electrode and the workpiece for the introduction of a fluid dielectric into the operating gap.

Machines of this type are known per se. They can serve for roughly processing the workpiece as well as fine finishing with a single processing electrode or with electrodes of equal size. The workpiece and processing electrode at the same time execute a circular movement in relation to one another around the feed direction of the processing electrode which simulates for the workpiece a finishing electrode enlarged as compared to that used for the rough finishing, so that only a single electrode is required.

The machine has the disadvantage that the actual processing gap of the arrangement moves with the planetary movement of the electrode. The narrowest spot between the processing electrode and the workpiece of course forms the actual operating gap which moves with the above mentioned circular movement. The periodic change of the width of the operating gap leads to a change in the injected quantity of the liquid dielectric which in the narrowest part of the operating gap is particularly undesirable.

The present invention overcomes this problem and improves the feeding in of the dielectric fluid to the operating gap.

According to the invention, this is achieved by controlling feed of the liquid dielectric to the injection nozzles by a structure controlled by the planetary movement of the workpiece in such a way that the dielectric flowing into the operating gap by way of the injection nozzles in its geometric course follows the planetary movement. The switching may be controlled electrically or mechanically. In the embodiment described below a mechanical platen is driven with the structure providing planetary motion to control supply of the fluid to the injection nozzles. The attached drawings therefore describe a mechanical embodiment illustrated schematically.

Figure 1:
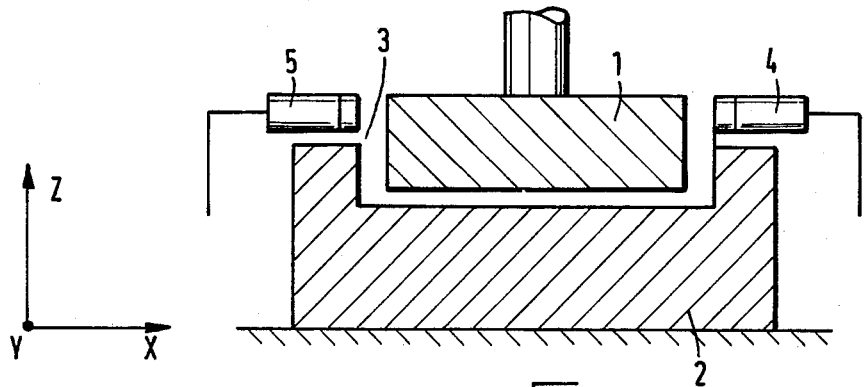
FIG. 1 shows a section side view illustrating the position of the operating electrode in relation to the workpiece.
Figure 2:
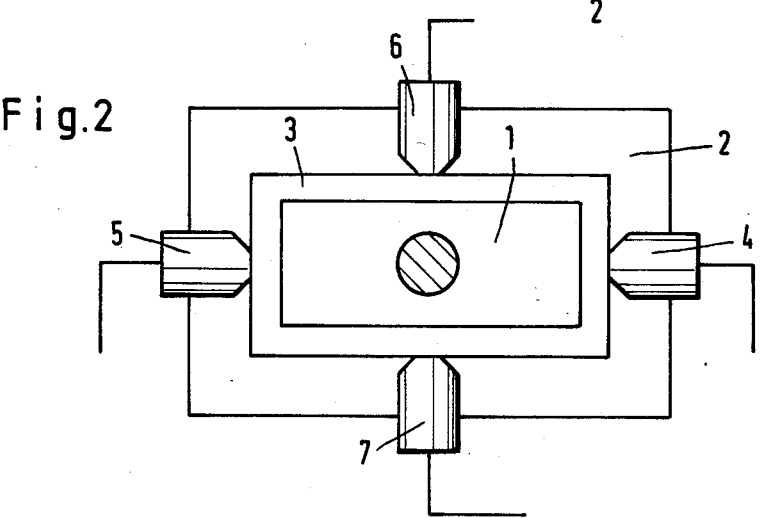
FIG. 2 shows a top view of the apparatus of FIG. 1.

Referring to FIGS. 1 and 2, the processing electrode 1 may be lowered in the customary manner into the workpiece 2. Injection nozzles 4, 5, 6 and 7 spray liquid dielectric into the operating gap 3. The workpiece is mounted on a cross table, which executes in the customary manner a circular movement around the axis of the processing electrode. The movement of rotation is only small, but simulates a larger processing electrode for the workpiece 2, so that finishing processes may be carried out with the single processing electrode.

Figure 3:
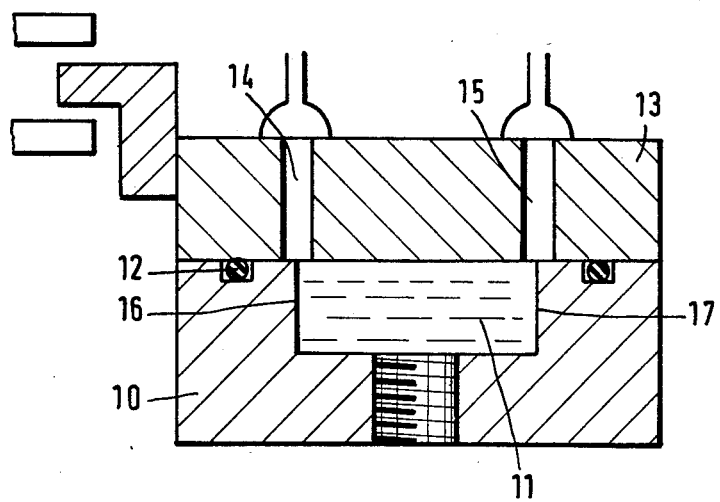
FIG. 3 shows a side sector view mechanical switch for the injection nozzles according to the present invention.

Injection nozzles 4, 5, 6 and 7, depending on the direction of the movement of the workpiece 2 executing the planetary movement, are put into operation by the switching arrangement shown in FIG. 3. Processing electrode 1 and workpiece 2 are included in the circuit of an electric DC current impulse source for the measuring of the operating impulses. Element 10 has a hollow interior chamber to receive a fluid and is connected to a liquid source (not shown) for that purpose. Chamber 11 is closed with the help of seals 12 and a control plate 13. Control plate 13 carries four bores of which only two, bores 14 and 15, are visible in FIG. 3. Bores 14 and 15 terminate at bores walls 16 and 17 of chamber 11 which to a greater or lesser extent close the bores and therefore define the size of the openings between the bores and the chamber, depending on the position of the control plate 13. The other two walls at chamber 11 are similarly positioned with respect to the other two recesses. Control plate 13 is coupled mechanically with the workpiece carrier of the arrangement moves with the carrier and workpiece. Thus, the pertinent openings 14, 15 . . . are opened and closed in dependence on the planetary movement. The recesses 14 and 15 are connected by way of corresponding lines with the liquid nozzles 4, 5, 6, 7 in such a way that the inflowing dielectric is controlled in accordance on the planetary movement.

What is claimed is:

1. An apparatus for spark-erosive planetary eroding of a workpiece comprising:

an eroding electrode adapted to be lowered into a workpiece as the workpiece is eroded and the workpiece and electrode carry out planetary motion with respect to each other so that the width of an operating gap between the periphery of the electrode and the workpiece varies around the periphery of the electrode during said planetary motion;

a plurality of injection nozzles positioned around said gap for supplying liquid dielectric thereto; and means for controlling flow of said dielectric to said nozzles in accordance with said planetary movement; wherein said workpiece moves with respect to said electrode and said controlling means is mechanically coupled to said workpiece for movement with said workpiece; and said controlling means includes an element having a chamber therein for receiving said liquid dielectric, a plate closing said chamber and having a plurality of bores, each corresponding to one of said nozzles, extending therethrough to communicate with said chamber and supply said liquid dielectric to one of said nozzles, said bores each terminating at a wall of said chamber to define an opening between said chamber and said bore, and means for rotating said plate in accordance with said planetary motion and with respect to said chamber so that said openings are varied in size in accordance with said planetary motion to accordingly vary the supply of said liquid dielectric to said injection nozzles.

* * * * *